United States Patent
Lim et al.

(10) Patent No.: US 10,585,726 B2
(45) Date of Patent: Mar. 10, 2020

(54) PARAMETER-SHARING APPARATUS AND METHOD

(71) Applicant: ELECTRONICS AND TELECOMMUNICATIONS RESEARCH INSTITUTE, Daejeon (KR)

(72) Inventors: Eun-Ji Lim, Daejeon (KR); Shin-Young Ahn, Daejeon (KR); Yong-Seok Choi, Daejeon (KR); Young-Choon Woo, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/979,169

(22) Filed: May 14, 2018

(65) Prior Publication Data

US 2018/0336076 A1    Nov. 22, 2018

(30) Foreign Application Priority Data

May 16, 2017    (KR) ........................ 10-2017-0060400

(51) Int. Cl.
| H04L 7/04 | (2006.01) |
| G06F 9/54 | (2006.01) |
| G06F 9/52 | (2006.01) |
| G06N 20/00 | (2019.01) |
| G06F 15/167 | (2006.01) |

(52) U.S. Cl.
CPC ................ G06F 9/544 (2013.01); G06F 9/52 (2013.01); G06F 15/167 (2013.01); G06N 20/00 (2019.01)

(58) Field of Classification Search
CPC .......... G06F 9/544; G06F 9/52; G06F 15/167; G06N 20/00
See application file for complete search history.

(56) References Cited

U.S. PATENT DOCUMENTS

| 8,116,243 | B2 | 2/2012 | Zhiying et al. |
| 8,738,551 | B2 | 5/2014 | Jeon |
| 8,768,870 | B1 | 7/2014 | Corrado et al. |
| 2010/0229183 | A1 | 9/2010 | Bae et al. |

(Continued)

FOREIGN PATENT DOCUMENTS

| KR | 10-2012-0140104 A | 12/2012 |
| KR | 10-2016-0140394 A | 12/2016 |

OTHER PUBLICATIONS

Feng Niu et al. "A Lock-Free Approach to Parallelizing Stochastic Gradient Descent" (Year: 2011) pp. 1-9.*

*Primary Examiner* — Andy Ho
*Assistant Examiner* — Abdou K Seye

(57) ABSTRACT

A parameter-sharing apparatus includes a memory allocation unit for managing allocation of a memory area, in which a parameter is to be stored, to a memory box, and updating a mapping table stored in the memory box based on allocation management of the memory area, and an operation processing unit for providing the memory allocation unit with parameter information required for the allocation management of the memory area in which the parameter is to be stored and sharing the parameter stored in the memory box.

12 Claims, 8 Drawing Sheets

(56) References Cited

U.S. PATENT DOCUMENTS

| | | | |
|---|---|---|---|
| 2014/0081934 A1* | 3/2014 | Mizell | G06F 16/2308 707/696 |
| 2015/0146716 A1* | 5/2015 | Olivier | H04L 65/1016 370/352 |
| 2015/0324690 A1 | 11/2015 | Chilimbi et al. | |
| 2016/0105411 A1* | 4/2016 | Vallieres | H04L 9/12 |
| 2016/0350645 A1 | 12/2016 | Brothers et al. | |
| 2017/0255571 A1* | 9/2017 | Dupont De Dinechin | G06F 12/0811 |
| 2017/0316002 A1* | 11/2017 | Mittal | G06F 16/2255 |
| 2018/0137032 A1* | 5/2018 | Tannous | G06F 11/3664 |

\* cited by examiner

PARAMETER-SHARING APPARATUS AND METHOD

CROSS REFERENCE TO RELATED APPLICATION

This application claims the benefit of Korean Patent Application No. 10-2017-0060400, filed May 16, 2017, which is hereby incorporated by reference in its entirety into this application.

BACKGROUND OF THE INVENTION

1. Technical Field

The present invention relates generally to parameter technology, and more particularly, to technology for allowing workers for distributed training of deep learning model to share model parameters with each other.

2. Description of the Related Art

A deep-learning model, which has recently contributed to the development of image recognition, speech recognition, and natural language processing and which has recently attracted attention, is an artificial neural network-based machine-learning method which simulates human biological neurons and forces a machine to learn information.

Recent deep-learning models have evolved into large-scale models, the layers of which become deeper and which have more features so as to improve the recognition performance of applications. The larger the scale of deep-learning models and the greater the amount of input data, the greater the number of parameters to be trained and the greater the computational load. Accordingly, a large number of computers may be required, and training may be accelerated if the computers perform calculations in parallel in a distributed system.

In distributed parallel processing for deep learning model training, individual distributed computer devices (i.e. worker) may share parameters calculated thereby with each other while a training process is repeated. Many distributed deep learning systems use a centralized parameter server to share model parameters while training model. The parameter server maintains values of parameters of the model. The parameter server collects the calculation result from respective workers in each training iteration and updates values of the parameters by using collected calculation result. The parameter server sends updated values of parameters to workers.

Parameter update method may be classified into a synchronous method and an asynchronous method. The synchronous method is a method in which parameter server aggregates calculation results of all workers and updates the values of the parameters in every training iteration. The asynchronous method is a method in which parameter server updates the values of parameters whenever calculation result arrives from a worker, without aggregating them. The asynchronous scheme is advantageous in that training can be rapidly performed without greatly sacrificing accuracy compared to the synchronous scheme, and thus the asynchronous scheme has been widely adopted in recent distributed deep learning.

In distributed deep learning, the larger the number of workers, the higher the parallelism. Thus, the overall computing speed is improved, but the time required to communicate with the parameter server is relatively increased. When the speed of communication with the parameter server is low, overall training performance may be deteriorated. Therefore, when a deep-learning model is trained in a distributed parallel environment, a parameter exchange time may be regarded as an important factor.

Meanwhile, as related technology, there is disclosed Korean Patent Application Publication No. 10-2012-0140104 entitled "Data storing method of memory". This technology relates to a method of storing data in memory, and more particularly, to a method of storing data in the memory, which can efficiently store learning data, calculated depending on the conditions of respective variables in a vehicle controller or the like, in a memory area.

The technology in Korean Patent Application Publication No. 10-2012-0140104 is intended to efficiently store learning data (i.e. parameters) in the memory, but does not present a scheme for allowing multiple workers to effectively share the parameters stored in the memory with each other.

SUMMARY OF THE INVENTION

Accordingly, the present invention has been made keeping in mind the above problems occurring in the prior art, and an object of the present invention is to allow a plurality of workers to share parameters with each other through the shared memory of a memory box, which is a shared memory device, instead of using a parameter server to share parameters therebetween in distributed deep learning, thus accelerating deep learning.

Further, a parameter server and workers transmit and receive parameters in a request-response manner over a communication network (e.g. the Ethernet) between computers. In other words, when a worker needs a parameter value, it sends a request message for the parameter value to the parameter server, and the parameter server reads the parameter value from its main memory and transmits the parameter value to the worker in response to the request. In contrast, when the worker desires to update a parameter value, the worker sends a parameter update request message including a parameter difference value or a parameter modification value to the parameter server, and the parameter server updates the parameter value, stored in the main memory, with the received value and sends a response message to the worker.

When distributed deep learning is performed, the transmission and reception of a large number of parameters frequently occur between multiple distributed workers. In this case, when the parameter server is used in the above-described way, a great communication overhead is incurred over a network, and the time required for message processing by the workers and the parameter server may be greatly increased. Therefore, there is required a scheme that is improved compared to the existing scheme.

In contrast, a memory box is a single device that can be mounted and used in a computer, rather than a stand-alone computer. The memory box has large-capacity memory and is connected to a computer through a system bus, such as a Peripheral Component Interconnect-express (PCIe) bus. Therefore, the memory box may provide data at very high speed compared to the parameter server. Also, since the memory box may have a plurality of connectors, it may be simultaneously connected to a plurality of workers, and may then be shared by the workers. The plurality of workers may use the large-capacity memory possessed by the memory box as shared memory.

Due to this difference between the parameter server and the memory box, the usage methods thereof are greatly different from each other. Since the memory box is a computer device, a worker actively operates when using the memory box. In other words, the worker reads data and fetches a parameter value from the memory box. Conversely, the worker may write data to the memory box and then store a parameter value in the memory box. Further, in order for distributed workers to share deep-learning parameters using the shared memory, a new parameter-sharing method is required.

Due to these features, it is impossible to use the memory box using only a distributed deep-learning framework which uses the existing parameter server. When parameters are shared using the memory box, training of the deep learning may be accelerated owing to the high access speed of the memory box. However, in order to use the memory box, a distributed deep-learning framework must be modified such that parameters are shared through the memory box.

Another object of the present invention is to provide a parameter-sharing apparatus and method, which allow a plurality of workers to share parameters with each other through the shared memory of a memory box in distributed deep learning.

A further object of the present invention is to allow a plurality of workers to transparently share parameters with each other through a memory box, without modifying the original function of a deep-learning framework and a deep-learning model development and training interface used by a user, when supporting a scheme in which a parameter server is replaced with the memory box in distributed deep learning.

In accordance with an aspect of the present invention to accomplish the above objects, there is provided a parameter-sharing method using a parameter-sharing apparatus, the method including receiving parameter information for allocating a memory area for a parameter to be stored in a memory box; locking a mapping table of the memory box and reading the mapping table; determining, based on the parameter information, whether a memory area for the parameter has been allocated in the memory box through the mapping table; writing the mapping table, in which mapping information is modified depending on whether the memory area has been allocated, to the memory box and unlocking the mapping table; and sharing the parameter in consideration of a memory address at which the memory area is allocated.

Receiving the parameter information may be configured to receive parameter information including at least one of an identifier and a size of the parameter.

Here, the parameter size may be a memory size needed to store the parameter.

The mapping table may be configured such that pieces of mapping information including the identifiers of parameters, memory addresses of memory areas, and reference counts are recorded in respective entries.

Determining whether the memory area for the parameter has been allocated may be configured to check the entries of the mapping table, and when the memory area for the corresponding parameter has been allocated in the memory box, increase a reference count in an entry of the mapping table corresponding to the parameter, thus updating the mapping table.

Determining whether the memory area for the parameter has been allocated may be configured to check the entries of the mapping table, and when the memory area for the corresponding parameter has not been allocated in the memory box, allocate a memory area corresponding to a size of the parameter to the memory box, and add mapping information about the parameter for which the memory area is allocated to a new entry of the mapping table, thus updating the mapping table.

Unlocking the mapping table may be configured to record a memory address of the parameter for which the memory area is allocated in the memory box, in the parameter-sharing apparatus.

Sharing the parameter may include reading a value of the parameter in the memory box with reference to the memory address recorded in the parameter-sharing apparatus; calculating a parameter difference value corresponding to the parameter value read from the memory box using a model algorithm; and modifying the parameter value of the memory box using the parameter difference value.

Modifying the parameter value may be configured to, when the memory box is capable of performing an assign_add function, modify the parameter value of the memory box using the parameter difference value through the assign_add function of the memory box.

Modifying the parameter value may be configured to, when the memory box is incapable of performing an assign_add function, re-read the parameter value from the memory box and write a parameter modification value, calculated using the parameter difference value and the re-read parameter value, to the memory box.

In accordance with another aspect of the present invention to accomplish the above objects, there is provided a parameter-sharing method using a parameter-sharing apparatus, the method including receiving parameter information for releasing a memory area, in which a parameter is stored, from a memory box; locking a mapping table of the memory box and reading the mapping table; determining, based on the mapping table, whether to release the memory area to which the parameter is stored, from the memory box; writing the mapping table, in which mapping information is modified depending on whether to release the memory area, to the memory box, and unlocking the mapping table; and sharing the parameter in consideration of a memory address at which the memory area is released.

Receiving the parameter information may be configured to receive parameter information including at least one of an identifier of the parameter and a memory address of the memory area in which the parameter is stored.

The mapping table may be configured such that pieces of mapping information including the identifiers of parameters, memory addresses of memory areas, and reference counts are recorded in respective entries.

Reading the mapping table may include decreasing a reference count in an entry of the mapping table corresponding to the parameter, thus updating the mapping table; and deleting the memory address that corresponds to the parameter, recorded in the parameter-sharing apparatus.

Determining whether to release the memory area to which the parameter is stored may be configured to, when the reference count in the mapping table is a minimum value, release the memory area allocated in the memory box and delete the entry of the mapping table corresponding to the memory area.

Sharing the parameter may include reading a value of the parameter stored in the memory box with reference to the memory address recorded in the parameter-sharing apparatus; calculating a parameter difference value corresponding to the parameter value read from the memory box using a model algorithm; and modifying the parameter value of the memory box using the parameter difference value.

Modifying the parameter value may be configured to, when the memory box is capable of performing an assign_add function, modify the parameter value of the memory box using the parameter difference value through the assign_add function of the memory box.

Modifying the parameter value may be configured to, when the memory box is incapable of performing an assign_add function, re-read the parameter value from the memory box and write a parameter modification value, calculated using the parameter difference value and the re-read parameter value, to the memory box.

In accordance with a further aspect of the present invention to accomplish the above objects, there is provided a parameter-sharing apparatus, including a memory allocation unit for managing allocation of a memory area, in which a parameter is to be stored, to a memory box, and updating a mapping table stored in the memory box based on allocation management of the memory area; and an operation processing unit for providing the memory allocation unit with parameter information required for the allocation management of the memory area in which the parameter is to be stored and sharing the parameter stored in the memory box.

The memory allocation unit may include a parameter information reception unit for receiving the parameter information required for the allocation management of the memory area from the operation processing unit; a mapping table management unit for managing a lock of the memory box and updating the mapping table; and a shared memory management unit for modifying a reference count in the mapping table and then managing allocation of the memory area.

The memory allocation unit may check a number of additional parameter-sharing apparatuses that currently share the parameter in the memory area depending on the reference count.

The memory box may update a value of the parameter, stored in the memory box, using an assign_add function in response to a parameter value modification request from the operation processing unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
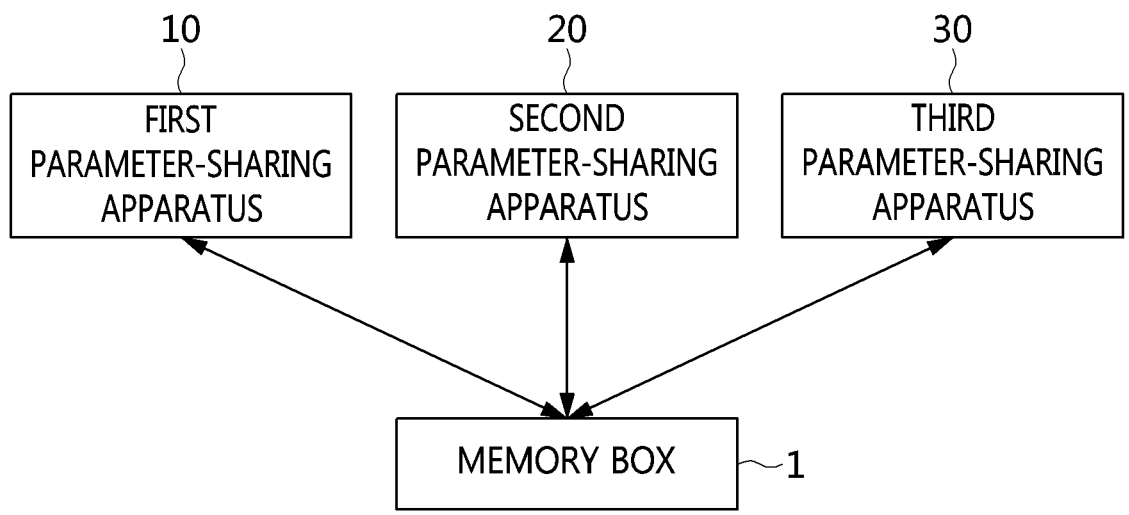
FIG. 1 is a block diagram illustrating a distributed deep-learning framework according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the attached drawings.

Figure 2:
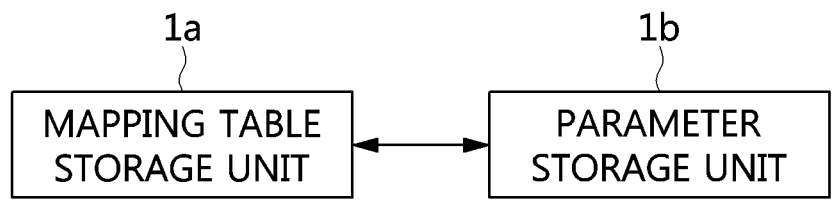
FIG. 2 is a block diagram illustrating in detail an example of the memory box illustrated in FIG. 1.
Figure 3:
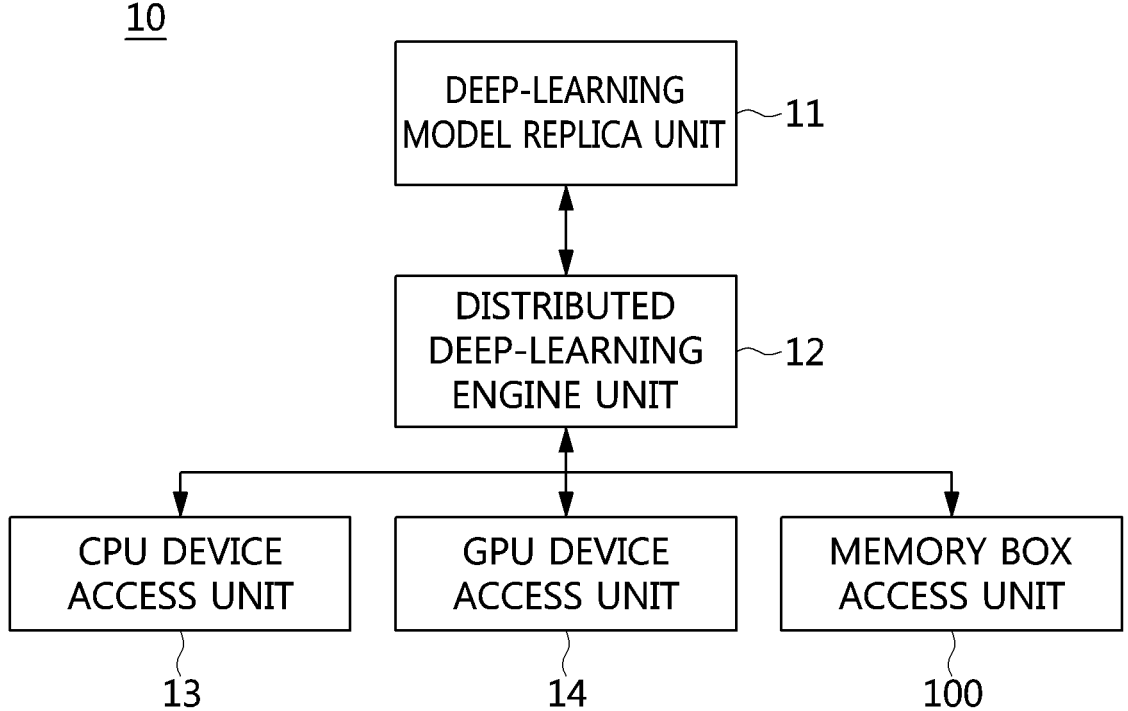
FIG. 3 is a block diagram illustrating a parameter-sharing apparatus according to an embodiment of the present invention.
Figure 4:
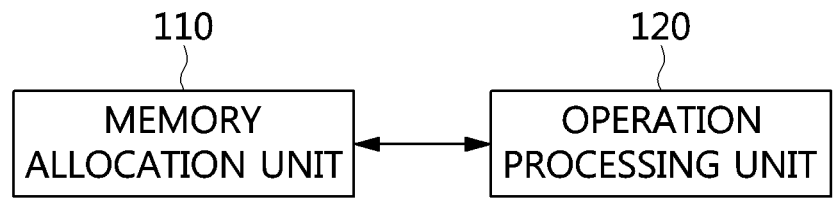
FIG. 4 is a block diagram illustrating in detail an example of the memory box access unit illustrated in FIG. 3.

FIG. 1 is a block diagram illustrating a distributed deep-learning framework according to an embodiment of the present invention. FIG. 2 is a block diagram illustrating in detail an example of the memory box illustrated in FIG. 1. FIG. 3 is a block diagram illustrating a parameter-sharing apparatus according to an embodiment of the present invention. FIG. 4 is a block diagram illustrating in detail an example of the memory box access unit illustrated in FIG. 3.

Referring to FIG. 1, the distributed deep-learning framework according to the embodiment of the present invention includes a plurality of parameter-sharing apparatuses 10, 20, and 30 and a memory box 1.

The parameter-sharing apparatuses 10, 20, and 30 may be stand-alone computer devices called workers in distributed deep learning.

Here, the parameter-sharing apparatuses 10, 20, and 30 may store deep-learning parameters in the memory box 1, and may collaboratively train the deep-learning parameters stored in the memory box 1 while sharing the deep-learning parameters.

The memory box 1 may be a shared memory device implemented as dedicated hardware, and may store and share data at higher speed. The memory box 1 may be a Field-Programmable Gate Array (FPGA) communication-accelerating shared memory device which allows multiple machines to share data with each other at low delay and at high speed.

Since the memory box 1 has a plurality of Peripheral Component Interconnect express (PCIe)-based connectors that are connectable to respective machines, the multiple machines may access the memory box 1 like a local device. The multiple machines may simultaneously access the memory box 1, and may have large-capacity memory.

Also, a computer node may read or write data from or to memory box 1 at higher speed than that of a normal network. Each computer node may read or write data from or to the memory box in a Direct Memory Access (DMA) or a Programmed Input/Output (PIO) mode. An application may use the memory box 1 through the device driver of the memory box and a library located at a level higher than the device driver. In the distributed parallel training of a deep-learning model, when the memory box 1 is used, parameters may be shared between workers at low delay and at high speed.

Further, the memory box 1 may have a data assign_add function (i.e. sum storage function), thus effectively updating deep-learning parameters.

Referring to FIG. 2, the memory box 1 according to an embodiment of the present invention includes a mapping table storage unit 1a and a parameter storage unit 1b.

The memory box 1 may store a mapping table and deep-learning parameters in the shared memory through the mapping table storage unit 1a and the parameter storage unit 1b.

In the mapping table, pieces of mapping information that include the identifiers of parameters, the memory addresses of memory areas, and reference counts may be recorded in respective entries.

Here, in the mapping table storage unit 1a, pieces of mapping information corresponding to respective parameter-sharing apparatuses 10, 20, and 30, which share parameters with the memory box 1, may be recorded.

Referring to FIG. 3, a first parameter-sharing apparatus 10 according to an embodiment of the present invention may include a deep-learning model replica unit 11, a distributed deep-learning engine unit 12, a Central Processing Unit (CPU) device access unit 13, a Graphics Processing Unit (GPU) device access unit 14, and a memory-box access unit 100.

The deep-learning model replica unit 11 may train parameters.

The distributed deep-learning engine unit 12 may be a lower engine for executing the deep-learning model replica unit 11, and may be configured to recognize the memory box 1 as a stand-alone device located in a local area and to store parameters in the memory box 1 through the memory box access unit 100 or to read parameters from the memory box 1 and conduct training.

The CPU device access unit 13 may access a CPU.

The GPU device access unit 14 may access a GPU.

The memory box access unit 100 may access the memory box 1.

The CPU and GPU perform computing operations, whereas the memory box 1 may be used to store parameters rather than to perform computing operations.

The memory box access unit 100 may use functions provided by the memory box 1 through an interface provided by a memory box device driver or a memory box device library located at a level higher than the device driver.

In other words, the memory box access unit 100 may use functions, such as reading, writing, locking, unlocking, and assign_add functions, with respect to the shared memory provided by the memory box 1.

The CPU and GPU may be components included in each worker, but the memory box 1 may be shared by a plurality of workers. In this case, when the workers access the same parameter, the memory box access unit 100 allows the workers to access the same memory address, thus enabling the workers to share the parameter.

Here, the memory box access unit 100 may be modularized, and may be connected to and used by existing workers so as to share parameters with the memory box 1.

That is, the memory box access unit 100 may correspond to the first parameter-sharing apparatus 10, which is connected to the worker and shares distributed deep-learning parameters based on the memory box 1.

Referring to FIG. 4, the memory box access unit 100 according to an embodiment of the present invention may include a memory allocation unit 110 and an operation processing unit 120.

The memory allocation unit 110 may manage allocation of a memory area, in which a parameter is to be stored, to the memory box 1, and may update a mapping table stored in the memory box based on the allocation management of the memory area.

Here, the memory allocation unit 110 may check the number of parameter-sharing apparatuses that currently share the parameter with each other in the memory area depending on a reference count, and may delete the memory address of the corresponding memory area from the operation processing unit and release the memory area from the memory box when the reference count becomes a minimum value.

The operation processing unit 120 may provide the memory allocation unit 110 with parameter information required for the allocation management of memory areas in which parameters are to be stored, and may share parameters stored in the memory box 1.

The operation processing unit 120 may update the values of parameters of the memory box 1, stored in the memory box 1, using the assign_add function of the memory box 1.

Figure 5:
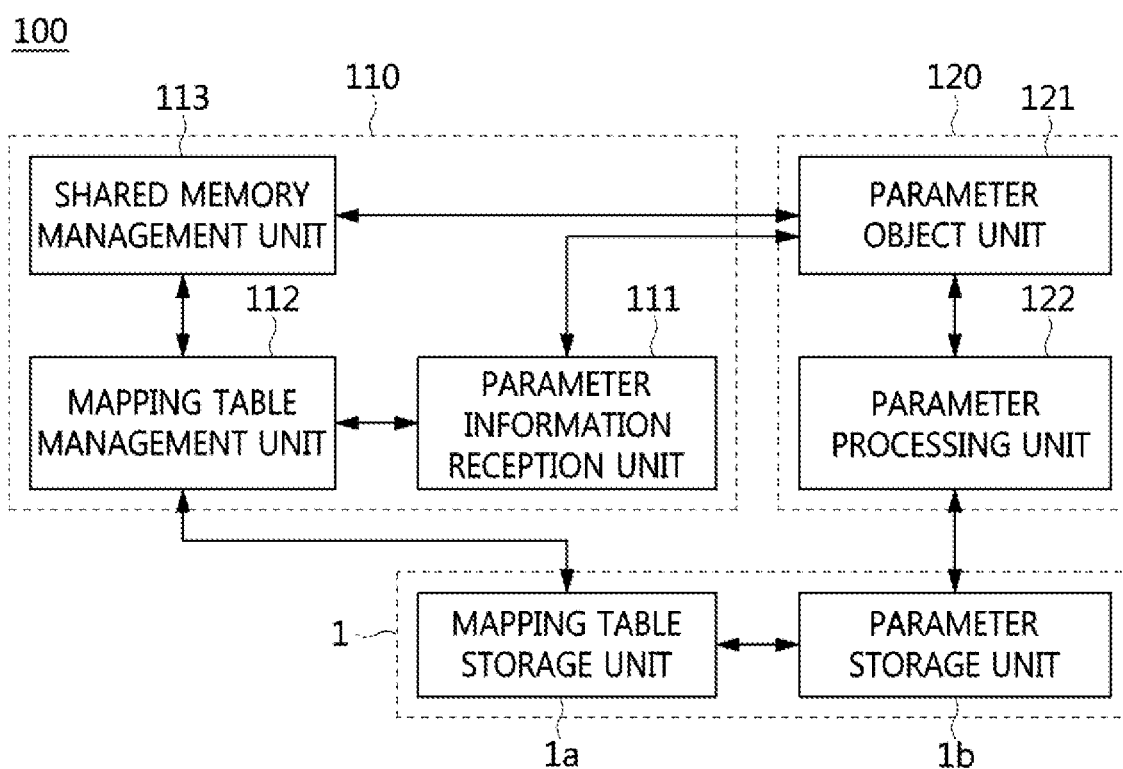
FIG. 5 is a block diagram illustrating in detail examples of the memory box and the memory box access unit illustrated in FIGS. 2 and 4.

FIG. 5 is a block diagram illustrating in detail examples of the memory box and the memory box access unit illustrated in FIGS. 2 and 4.

Referring to FIG. 5, the memory allocation unit 110 may include a parameter information reception unit 111, a mapping table management unit 112, and a shared memory management unit 113.

The operation processing unit 120 may include a parameter object unit 121 and a parameter processing unit 122.

The parameter information reception unit 111 may receive, from the parameter object unit 121, parameter information required in order to allocate memory, in which a parameter is to be stored, to the memory box 1 or release the allocated memory.

Here, the parameter information reception unit 111 may receive, from the parameter object unit 121, parameter information including at least one of the identifier of the parameter, the size of the parameter, and the memory address of the memory area in which the parameter is stored.

The mapping table management unit 112 may read a mapping table from the shared memory of the memory box 1. The mapping table may be a table which maintains mapping information between parameters and the memory addresses of the shared memory in which the parameters are stored. Respective entries of the mapping table may include parameter identifiers, shared memory addresses, and reference counts.

The shared memory management unit 113 may allocate a memory area for the corresponding parameter to the memory box 1.

The shared memory management unit 113 may determine whether a memory area for the parameter has been allocated in the memory box 1 by searching the mapping table read by the mapping table management unit 112.

The shared memory management unit 113 may determine whether the memory area for the parameter has been allocated by searching the mapping table for the parameter. If it is determined that the memory area has been allocated, the shared memory management unit 113 may increase a reference count in the corresponding entry of the mapping table, and may record the memory address of the memory area in the parameter object unit 121.

Here, if it is determined that a memory area has not been allocated, the shared memory management unit 113 may allocate a memory area for the parameter to the memory box 1, add a new entry to the mapping table, and record the address of the allocated memory area in the parameter object unit 121. The mapping table management unit 112 may write a modified mapping table to the memory box 1. Here, the mapping table management unit 112 may lock or unlock the memory area of the memory box 1.

The mapping table management unit 112 may lock the memory area of the memory box 1 in which the mapping table is stored before reading the mapping table, and may unlock the memory area after writing the modified mapping table to the memory box 1.

The memory address may designate a specific memory location in the entire memory area of the memory box 1. The memory address may be designated based on a scheme provided by the device driver or access library for the memory box, and may be a device memory address, a virtual address mapped to the device memory address, or an identifier mapped to the device memory address.

Also, the shared memory management unit 113 may release the memory area for the parameter allocated in the memory box 1.

The shared memory management unit 113 may search the mapping table read by the mapping table management unit 112, and may then determine whether to release the memory area for the parameter from the memory box 1.

Here, the shared memory management unit 113 may search the mapping table for the entry of the parameter for which the memory area is to be released using a parameter identifier or a memory address, and may then reduce the reference count corresponding to the entry.

Here, the shared memory management unit 113 may determine, based on the reference count, whether to release the memory area. That is, when the reference count is a minimum value (e.g. 0), the shared memory management unit 113 may release the memory area, whereas when the reference count is not the minimum value, the shared memory management unit 113 may not release the memory area.

Here, when determining to release the memory area, the shared memory management unit 113 may release the memory area for the parameter from the memory box 1, and may delete the corresponding entry from the mapping table. The mapping table management unit 112 may write the modified mapping table to the memory box. The mapping table management unit 112 may lock or unlock the memory area of the memory box 1. The mapping table management unit 112 may lock the memory area of the memory box 1 in which the mapping table is stored before reading the mapping table, and may unlock the memory area after writing the modified mapping table to the memory box 1.

The parameter object unit 121 may provide the memory address of the memory area for the parameter, as parameter information, to the parameter information reception unit 111.

The parameter processing unit 122 may write or read the value of a parameter to or from the memory box 1 using a memory address recorded in the parameter object unit 121, and may modify (update) the value of trained parameter using an assign_add function provided from the memory box 1.

The parameter processing unit 122 may read the parameter value of the memory box 1, stored in the memory box 1, and may calculate a parameter difference value corresponding to the parameter value read from the memory box using a model algorithm.

Here, as the model algorithm, a stochastic gradient descent algorithm may be used, and, in addition, various algorithms for calculating a parameter difference value may also be used.

Depending on whether the memory box 1 is capable of performing an assign_add function, the parameter processing unit 122 may modify the parameter value in the memory box using the parameter difference value through the assign_add function if the memory box 1 is found to be capable of performing the assign_add function.

Depending on whether the memory box 1 is capable of performing the assign_add function, the parameter processing unit 122 may calculate a parameter modification value using the parameter difference value and the parameter value of the memory box, and may write the parameter modification value to the memory box if the memory box 1 is found to be incapable of performing the assign_add function.

Figure 6:
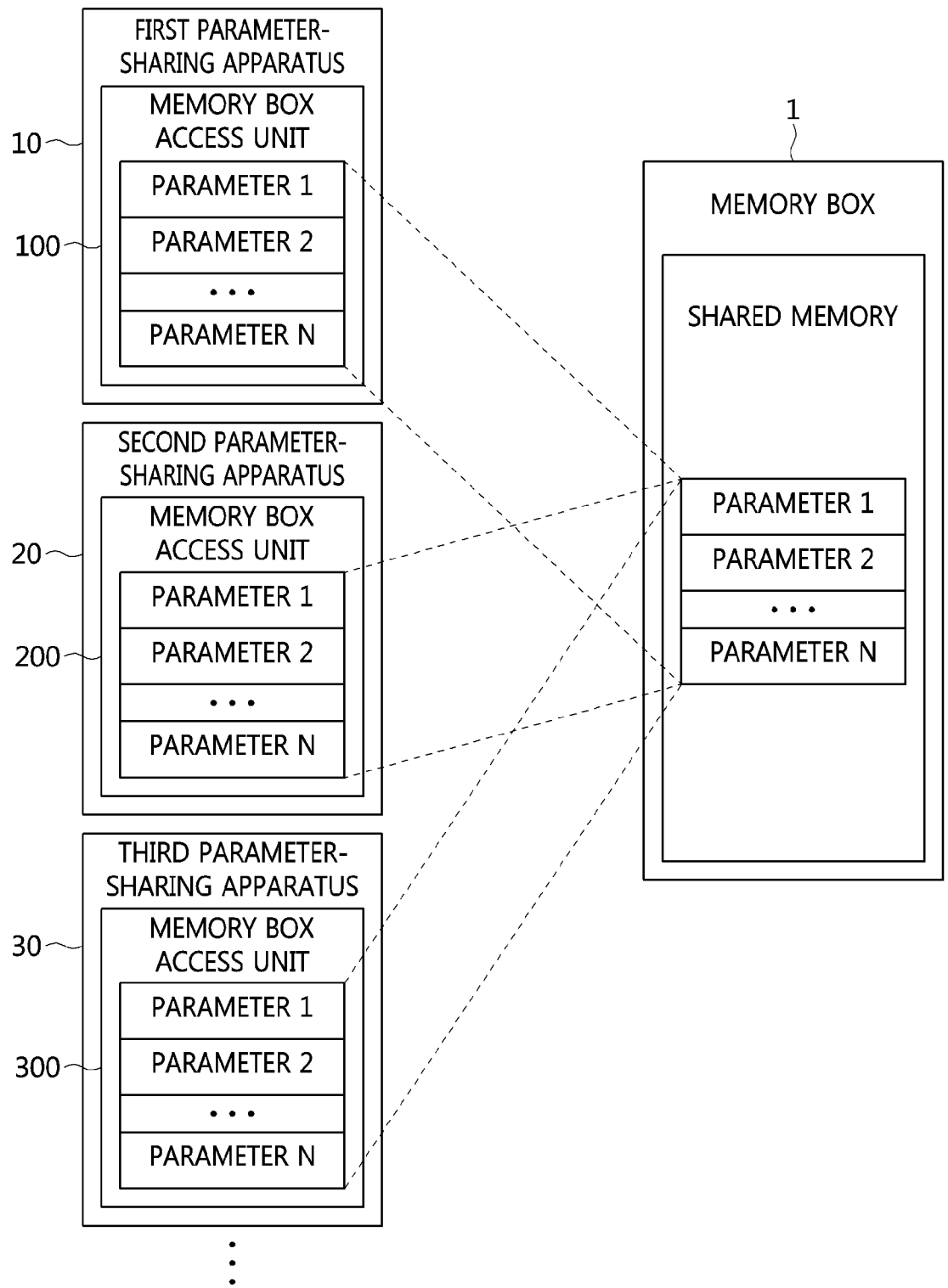
FIG. 6 is a diagram illustrating parameter sharing in a distributed deep-learning framework according to an embodiment of the present invention.

FIG. 6 is a diagram illustrating parameter sharing in a distributed deep-learning framework according to an embodiment of the present invention.

Referring to FIG. 6, in a parameter-sharing technique in the distributed deep-learning framework according to the embodiment of the present invention, parameter-sharing apparatuses 10, 20, and 30 may independently train multiple parameters through memory box access units 100, 200, and 300, respectively.

Here, the parameter-sharing apparatuses 10, 20, and 30 may store and train multiple parameters in the memory box 1 through the memory box access units 100, 200, and 300, respectively. When the parameter-sharing apparatuses 10, 20, and 30 try to access the same parameter in the memory box 1, the memory box access units 100, 200, and 300 may access the same memory address, thus sharing the same parameter.

In this case, the parameter-sharing apparatuses 10, 20, and 30 may update the parameter at the same memory address, and may read the updated parameter. Therefore, the parameter-sharing apparatuses 10, 20, and 30 may collaboratively train multiple parameters.

A parameter-sharing method according to an embodiment of the present invention may be divided into a parameter-sharing method for allocating a memory area and a parameter-sharing method for releasing an allocated memory area, and respective methods will be separately described below.

Figure 7:
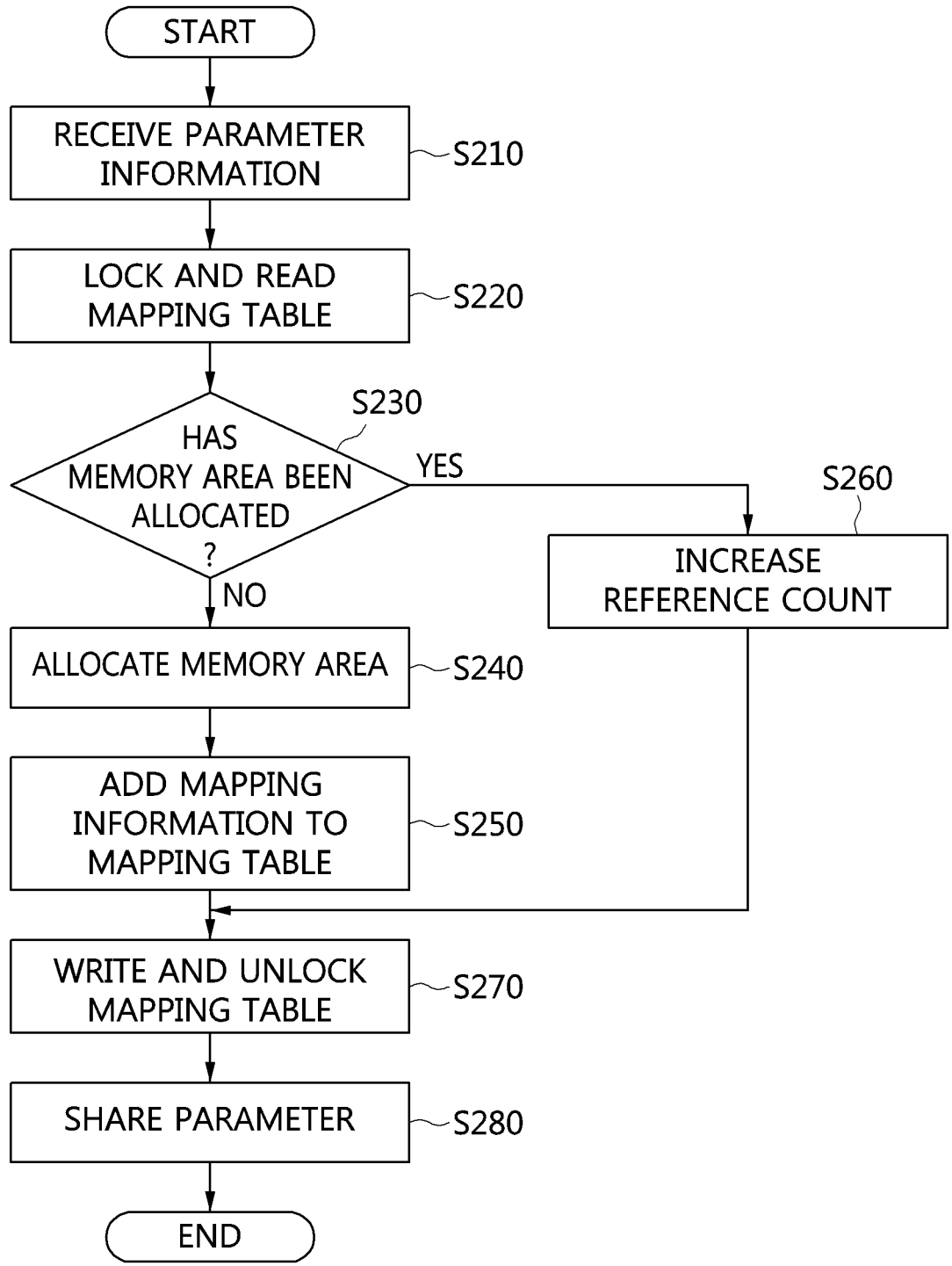
FIG. 7 is an operation flowchart illustrating a parameter-sharing method for memory area allocation according to an embodiment of the present invention.

FIG. 7 is an operation flowchart illustrating a parameter-sharing method for memory area allocation according to an embodiment of the present invention.

Referring to FIG. 7, the parameter-sharing method for memory area allocation according to the embodiment of the present invention may receive parameter information at step S210.

That is, at step S210, parameter information for allocating a memory area for a parameter to the memory box 1 may be received.

At step S210, parameter information including at least one of the identifier and the size of the parameter may be received.

The parameter size may be the size of memory needed to store the parameter.

A mapping table may be configured such that pieces of mapping information including the identifiers of parameters, the memory addresses of memory areas, and reference counts are recorded in respective entries.

The mapping table may also be configured such that pieces of mapping information corresponding to respective parameter-sharing apparatuses 10, 20, and 30, which share parameters with the memory box 1, are recorded.

That is, the mapping table may further include in advance pieces of information about the parameter-sharing apparatuses 10, 20, and 30, which share parameters with the memory box 1.

Next, the parameter-sharing method for memory area allocation according to the embodiment of the present invention may lock and read the mapping table at step S220.

That is, at step S220, the mapping table of the memory box 1 may be locked and then be read.

Next, the parameter-sharing method for memory area allocation according to the embodiment of the present invention may determine whether a memory area has been allocated at step S230.

If it is determined at step S230 that a memory area for the parameter has not been allocated in the memory box by checking the entry of the mapping table, a memory area may be allocated at step S240.

At step S240, a memory area corresponding to the size of the parameter may be allocated in the memory box.

Further, the parameter-sharing method for memory area allocation according to the embodiment of the present invention may add mapping information to the mapping table at step S250.

That is, if it is determined that a memory area for the parameter has not been allocated in the memory box by checking the entry of the mapping table, the memory area may be allocated, and mapping information about the parameter for which the memory area has been allocated may be added to a new entry of the mapping table, and thus the mapping table may be updated at step S250.

Further, if it is determined at step S230 that a memory area for the parameter has been allocated in the memory box by checking the entry of the mapping table, a reference count in the mapping table may be increased at step S260.

That is, at step S260, the reference count in the entry corresponding to the parameter may be increased in the mapping table, and thus the mapping table may be updated.

At step S260, the reference count may be increased by '1'.

Next, the parameter-sharing method for memory area allocation according to the embodiment of the present invention may write and unlock the mapping table at step S270.

That is, at step S270, depending on whether the memory area has been allocated, the mapping table in which the mapping information is modified may be written to the memory box 1, and the mapping table may be unlocked.

At step S270, the memory address of the parameter for which the memory area has been allocated in the memory box, may be recorded in the corresponding parameter-sharing apparatus.

Next, the parameter-sharing method for memory area allocation according to the embodiment of the present invention may share the parameter at step S280.

That is, at step S280, the parameter may be shared in consideration of the memory address at which the memory area is allocated.

At step S280, the parameter stored in the memory box 1 may be shared with reference to the memory address of the memory area of the parameter-sharing apparatuses 10, 20, and 30 in which the memory address of the allocated memory area is recorded as being added.

At step S280, the parameter stored in the memory box 1 may be shared with reference to memory addresses, which correspond to the parameter-sharing apparatuses 10, 20, and 30 and which are recorded in the mapping table of the memory box 1.

Here, at step S280, the parameter-sharing apparatuses 10, 20, and 30 may read the value of the parameter stored in the memory box 1.

At step S280, a parameter difference value corresponding to the parameter value read from the memory box 1 may be calculated using a model algorithm.

Here, as the model algorithm, a stochastic gradient descent algorithm may be used, and, in addition, various algorithms for calculating a parameter difference value may also be used.

At step S280, the parameter value of the memory box 1 may be modified using the parameter difference value.

Here, at step S280, when the memory box 1 is capable of performing an assign_add function, the parameter value of the memory box 1 may be modified using the parameter difference value through the assign_add function of the memory box 1.

Here, at step S280, the parameter-sharing apparatuses 10, 20, and 30 may check in advance whether the memory box 1 is capable of performing an assign_add function.

Further, at step S280, when the memory box 1 is incapable of performing an assign_add function, a parameter value may be re-read from the memory box 1, and a parameter modification value, which is calculated using the parameter difference value and the re-read parameter value, may be written to the memory box 1.

Here, step S280 may be repetitively performed one or more times.

That is, at step S280, training may be conducted using the parameter shared by the memory box 1.

At step S280, when the parameter-sharing apparatuses 10, 20, and 30 access the same parameter, they may access the same memory address, thus sharing the same parameter with each other.

At step S280, the parameter-sharing apparatuses 10, 20, and 30 may read the parameter at the same memory address, update the parameter, and re-read the updated parameter, and thus the parameter-sharing apparatuses 10, 20, and 30 may collaboratively train the parameter.

Furthermore, the procedure for sharing the parameter at step S280 will be described in detail later with reference to the description of FIGS. 9 and 10 by way of example.

Figure 8:
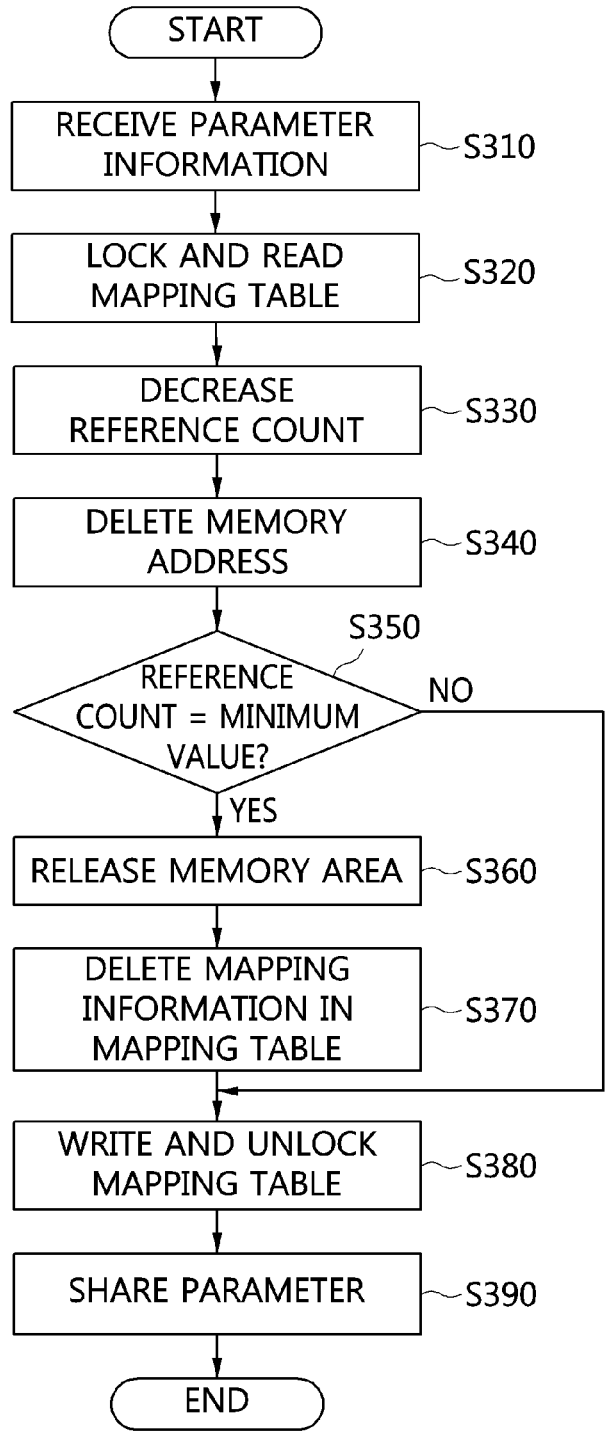
FIG. 8 is an operation flowchart illustrating a parameter-sharing method for memory area release according to an embodiment of the present invention.

FIG. 8 is an operation flowchart illustrating a parameter-sharing method for memory area release according to an embodiment of the present invention.

The parameter-sharing method for memory area release according to the embodiment of the present invention may receive parameter information at step S310.

That is, at step S310, parameter information for releasing a memory area for a parameter to the memory box 1 may be received.

At step S310, parameter information including at least one of the identifier of the parameter and the memory address of a memory area in which the parameter is stored may be received.

A mapping table may be configured such that pieces of mapping information including the identifiers of parameters, the memory addresses of memory areas, and reference counts are recorded in respective entries.

The mapping table may also be configured such that pieces of mapping information corresponding to respective parameter-sharing apparatuses 10, 20, and 30, which share parameters with the memory box 1, are recorded.

That is, the mapping table may further include in advance pieces of information about the parameter-sharing apparatuses 10, 20, and 30, which share parameters with the memory box 1.

Next, the parameter-sharing method for memory area release according to the embodiment of the present invention may lock and read the mapping table at step S320.

That is, at step S320, the mapping table of the memory box 1 may be locked and then be read.

Next, the parameter-sharing method for memory area release according to the embodiment of the present invention may decrease a reference count at step S330.

That is, at step S330, the reference count in the entry corresponding to the parameter is decreased in the mapping table, and thus the mapping table may be updated.

At step S330, the reference count may be decreased by '1'.

Next, the parameter-sharing method for memory area release according to the embodiment of the present invention may delete a memory address at step S340.

That is, at step S340, the memory address corresponding to the parameter recorded in the corresponding parameter-sharing apparatus may be deleted.

Next, the parameter-sharing method for memory area release according to the embodiment of the present invention may determine whether the reference count is a minimum value (e.g. '0') at step S350.

That is, if it is determined at step S350 that the reference count in the mapping table is the minimum value, the memory area allocated in the memory box 1 may be released at step S360, and the mapping information in the mapping table may be deleted at step S370.

That is, at step S370, the entry of the mapping table corresponding to the memory area may be deleted.

Further, if it is determined at step S350 that the reference count in the mapping table is not a minimum value, the memory area is not released, and the mapping table for which the reference count is modified may be updated.

Next, the parameter-sharing method for memory area release according to the embodiment of the present invention may write and unlock the mapping table at step S380.

That is, at step S380, depending on whether to release the memory area, the mapping table in which the mapping information is modified may be written to the memory box 1, and the mapping table may be unlocked.

Further, the parameter-sharing method for memory area release according to the embodiment of the present invention may share the parameter at step S390.

That is, at step S390, the parameter may be shared in consideration of a memory address at which the memory area is released.

At step S390, the parameter stored in the memory box 1 may be shared with reference to the memory addresses of the remaining memory areas of the parameter-sharing apparatuses 10, 20 and 30, in which the memory address of the released memory area is recorded as being deleted.

At step S390, the parameter stored in the memory box 1 may be shared with reference to memory addresses, which correspond to the parameter-sharing apparatuses 10, 20, and 30 and which are recorded in the mapping table of the memory box 1.

Here, at step S390, the value of the parameter stored in the memory box 1 may be read with reference to the memory addresses recorded in the parameter-sharing apparatuses.

At step S390, a parameter difference value corresponding to the parameter value read from the memory box may be calculated using a model algorithm.

Here, as the model algorithm, a stochastic gradient descent algorithm may be used, and, in addition, various algorithms for calculating parameter difference values may also be used.

At step S390, the parameter value of the memory box may be modified using the parameter difference value.

Here, at step S390, when the memory box is capable of performing an assign_add function, the parameter value of the memory box may be modified using the parameter difference value through the assign_add function of the memory box.

Here, at step S390, the parameter-sharing apparatuses 10, 20, and 30 may check in advance whether the memory box 1 is capable of performing an assign_add function.

Here, at step S390, when the memory box is incapable of performing an assign_add function, a parameter value may be re-read from the memory box, and a parameter modification value, which is calculated using the parameter difference value and the re-read parameter value, may be written to the memory box.

Here, step S390 may be repetitively performed one or more times.

That is, at step S390, training may be conducted using the parameter shared by the memory box 1.

Further, at step S390, when the parameter-sharing apparatuses 10, 20, and 30 access the same parameter, they may access the same memory address, thus sharing the same parameter with each other.

At step S390, the parameter-sharing apparatuses 10, 20, and 30 may read the parameter at the same memory address, update the parameter, and re-read the updated parameter, and thus the parameter-sharing apparatuses 10, 20, and 30 may collaboratively learn the parameter.

Furthermore, the procedure for sharing the parameter at step S390 will be described in detail below with reference to the description of FIGS. 9 and 10 by way of example.

Figure 9:
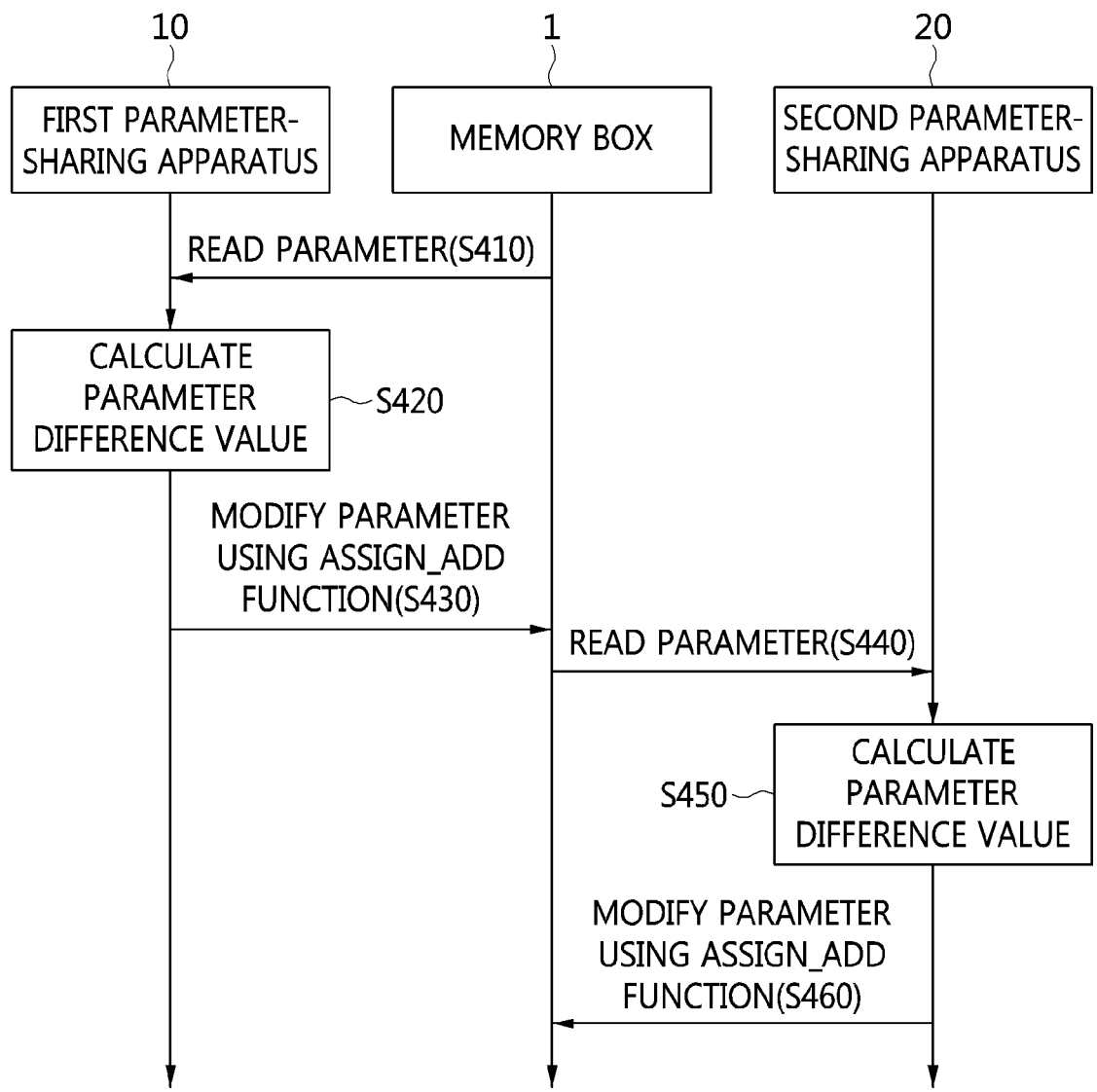
FIG. 9 is a sequence diagram illustrating a parameter-sharing method using an assign_add function when a memory box is capable of performing the assign_add function according to an embodiment of the present invention.

FIG. 9 is a sequence diagram illustrating a parameter-sharing method using an assign_add function when a memory box is capable of performing the assign_add function according to an embodiment of the present invention.

Referring to FIG. 9, in the parameter-sharing method using an assign_add function when the memory box is capable of performing the assign_add function according to the embodiment of the present invention, the first parameter-sharing apparatus 10 may read a parameter at step S410.

That is, at step S410, the first parameter-sharing apparatus 10 may read the first parameter value of a memory box from the memory box 1.

Further, the parameter-sharing method using an assign_add function according to the embodiment of the present invention may calculate a parameter difference value at step S420.

That is, at step S420, the first parameter-sharing apparatus 10 may calculate a first parameter difference value using a model algorithm.

Here, as the model algorithm, a stochastic gradient descent algorithm may be used, and, in addition, various algorithms for calculating parameter difference values may also be used.

Next, the parameter-sharing method using an assign_add function according to the embodiment of the present invention may modify the parameter using the assign_add function at step S430.

That is, at step S430, the second parameter value of a memory box may be generated by modifying (updating) the first parameter value of the memory box using the first parameter difference value through the assign_add function of the memory box 1.

$$W_{t+1} = W_t + \Delta W_t \qquad (1)$$

For example, it can be seen that Equation (1) represents an example of the assign_add function in the form of a formula.

At step S430, as shown in Equation (1), the second parameter value of the memory box $W_{t+1}$ may be generated by adding the first parameter difference value $\Delta W_t$ to the first parameter value of the memory box $W_t$.

Further, in the parameter-sharing method using an assign_add function according to the embodiment of the present invention, the second parameter-sharing apparatus 20 may read a parameter at step S440.

That is, at step S440, the second parameter-sharing apparatus 20 may read the second parameter value of the memory box from the memory box 1.

Here, since the first parameter-sharing apparatus 10 and the second parameter-sharing apparatus 20 asynchronously share the parameter, step S440 may be performed together with any of steps S410 to S430 regardless of the parameter update procedure by the first parameter-sharing apparatus 10, rather than being necessarily performed after step S430, as illustrated in FIG. 9.

Therefore, at step S440, the first parameter value of the memory box in which the first parameter difference value is not updated through the assign_add function may also be read.

However, hereinafter, a description will be made on the assumption that the second parameter value of the memory box which has been updated is read.

In such an asynchronous parameter-sharing method, there may be a slight loss in accuracy during the parameter value is being updated. However, since the parameter update may be performed quickly than the case that reflecting the calculation result accurately, achievement of the final target accuracy and the model training may be completed at high speed.

Next, the parameter-sharing method using an assign_add function according to the embodiment of the present invention may calculate a parameter difference value at step S450.

That is, at step S450, the second parameter-sharing apparatus 20 may calculate a second parameter difference value using a model algorithm.

Here, as the model algorithm, a stochastic gradient descent algorithm may be used, and, in addition, various algorithms for calculating parameter difference values may also be used.

Further, the parameter-sharing method using an assign_add function according to the embodiment of the present invention may modify the parameter using the assign_add function at step S460.

That is, at step S460, the third parameter value of a memory box may be generated by modifying (updating) the second parameter value of the memory box using the second parameter difference value through the assign_add function of the memory box 1.

Here, at step S460, as shown in Equation (1), the third parameter value of the memory box $W_{t+1}$ may be generated by adding the second parameter difference value $\Delta W_t$ to the second parameter value of the memory box $W_t$.

Through this procedure, multiple parameter-sharing apparatuses (workers) may update the parameter values of the memory box 1 using the assign_add function while asynchronously reading parameter values from the memory box 1.

Figure 10:
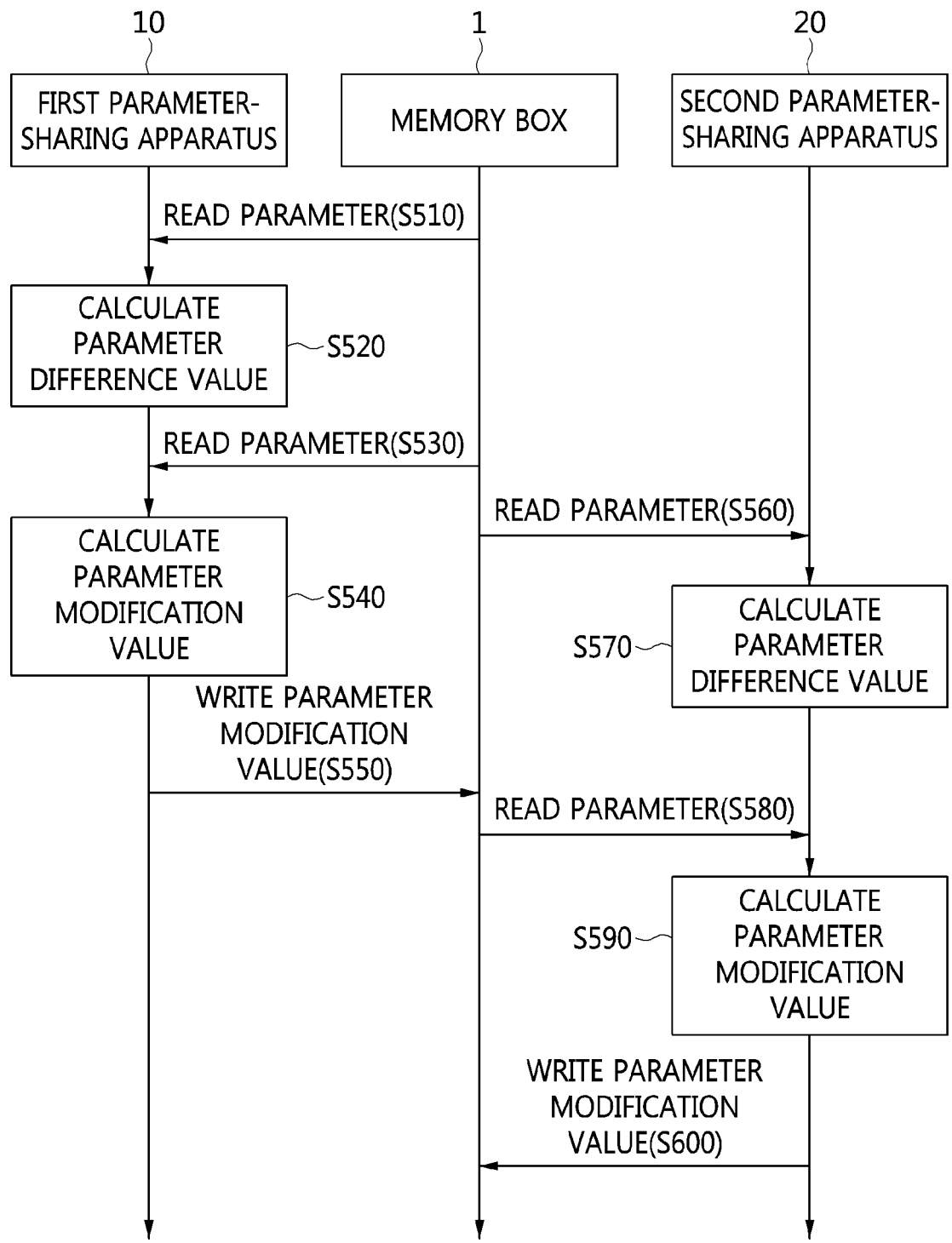
FIG. 10 is a sequence diagram illustrating a parameter-sharing method when a memory box is incapable of performing an assign_add function according to an embodiment of the present invention.

FIG. 10 is a sequence diagram illustrating a parameter-sharing method when a memory box is incapable of performing an assign_add function according to an embodiment of the present invention.

Referring to FIG. 10, in the parameter-sharing method when the memory box is incapable of performing the assign_add function according to the embodiment of the present invention, the first parameter-sharing apparatus 10 may read a parameter at step S510.

That is, at step S510, the first parameter-sharing apparatus 10 may read the first parameter value of a memory box from the memory box 1.

Next, the parameter-sharing method when the memory box is incapable of performing an assign_add function according to the embodiment of the present invention may calculate a parameter difference value at step S520.

That is, at step S520, the first parameter-sharing apparatus 10 may calculate a first parameter difference value using a model algorithm.

Here, as the model algorithm, a stochastic gradient descent algorithm may be used, and, in addition, various algorithms for calculating parameter difference values may also be used.

Next, the parameter-sharing method when the memory box is incapable of performing an assign_add function according to the embodiment of the present invention may read a parameter value at step S530.

That is, at step S530, since the parameter value of the memory box 1 may be modified by an additional parameter-sharing apparatus while the parameter difference value is being calculated at step S520, the parameter value of the memory box 1 may be re-read.

In this case, at step S530, the first parameter value of the memory box may be re-read only when the parameter difference value at step S520 is not calculated before a preset time has elapsed.

Next, the parameter-sharing method when the memory box is incapable of performing an assign_add function according to the embodiment of the present invention may calculate a parameter modification value at step S540.

That is, at step S540, a first parameter modification value may be calculated using the calculated first parameter difference value and the first parameter value of the memory box read from the memory box 1.

At step S540, when the parameter difference value is calculated within the preset time at step S520, the first parameter modification value may be calculated using the first parameter value of the memory box, which is read at step S510.

Further, at step S540, when the parameter difference value is calculated after the preset time has elapsed at step S520, the first parameter modification value may be calculated using the first parameter value of the memory box, which is re-read at step S530.

$$W_{t+1} = W_t' + \Delta W_t \qquad (2)$$

For example, it can be seen that Equation (2) represents an example of update of the parameter value in the form of a formula.

Here, at step S540, as shown in Equation (2), the first parameter modification value $W_{t+1}$ may be generated by adding the first parameter difference value $\Delta W_t$ to the first parameter value $W_t'$ of the memory box.

Next, the parameter-sharing method when the memory box is incapable of performing an assign_add function according to the embodiment of the present invention may write the parameter modification value at step S550.

That is, at step S550, the parameter value of the memory box 1 may be modified (updated) by writing the calculated first parameter modification value to the memory box 1.

Here, at step S550, the second parameter value of a memory box may be generated by writing the first parameter modification value as the first parameter value of the memory box.

Next, in the parameter-sharing method when the memory box is incapable of performing an assign_add function according to the embodiment of the present invention, the second parameter-sharing apparatus 20 may read a parameter at step S560.

That is, at step S560, the second parameter-sharing apparatus 20 may read the second parameter value of the memory box from the memory box 1.

Here, since the first parameter-sharing apparatus 10 and the second parameter-sharing apparatus 20 asynchronously share the parameter, step S560 may be performed at any of steps S510 to S550, regardless of the parameter update procedure by the first parameter-sharing apparatus 10, rather than being necessarily performed after step S530, as illustrated in FIG. 10.

Therefore, at step S560, the first parameter value of the memory box in which the first parameter modification value is not updated may also be read, as illustrated in FIG. 10.

However, hereinafter, a description will be made on the assumption that the second parameter value of the memory box which has been updated is read.

In such an asynchronous parameter-sharing method, there may be a slight loss in accuracy during the parameter value is being updated. However, since the parameter update may be performed quickly than the case that reflecting the calculation result accurately, achievement of the final target accuracy and the model training may be completed at high speed.

Next, the parameter-sharing method when the memory box is incapable of performing an assign_add function according to the embodiment of the present invention may calculate a parameter difference value at step S570.

That is, at step S570, the second parameter-sharing apparatus 20 may calculate a second parameter difference value using a model algorithm.

Here, as the model algorithm, a stochastic gradient descent algorithm may be used, and, in addition, various algorithms for calculating parameter difference values may also be used.

Further, the parameter-sharing method when the memory box is incapable of performing an assign_add function according to the embodiment of the present invention may read a parameter value at step S580.

That is, at step S580, since the parameter value of the memory box 1 may be modified by an additional parameter-sharing apparatus while the parameter difference value is being calculated at step S570, the parameter value of the memory box 1 may be re-read.

At step S580, the second parameter value of the memory box may be re-read only when the parameter difference value at step S570 is not calculated before a preset time has elapsed.

Next, the parameter-sharing method when the memory box is incapable of performing an assign_add function according to the embodiment of the present invention may calculate a parameter modification value at step S590.

That is, at step S590, a second parameter modification value may be calculated using the calculated second parameter difference value and the second parameter value of the memory box, which is read from the memory box 1.

At step S590, when the parameter difference value is calculated within the preset time at step S570, the second parameter modification value may be calculated using the second parameter value of the memory box, which is read at step S560.

Further, at step S590, when the parameter difference value is calculated after the preset time has elapsed at step S570, the second parameter modification value may be calculated using the second parameter value of the memory box, which is re-read at step S580.

Here, at step S590, as shown in Equation (2), the second parameter modification value $W_{t+1}$ may be generated by adding the second parameter difference value $\Delta W_t$ to the second parameter value of the memory box $W_t'$.

Next, the parameter-sharing method when the memory box is incapable of performing an assign_add function according to the embodiment of the present invention may write the parameter modification value at step S600.

That is, at step S600, the parameter value of the memory box 1 may be modified (updated) by writing the calculated second parameter modification value to the memory box 1.

Here, at step S600, the third parameter value of a memory box may be generated by writing the second parameter modification value as the second parameter value of the memory box.

Through this procedure, even if the memory box 1 is incapable of performing an assign_add function, multiple parameter-sharing apparatuses (i.e. workers) may update the parameter values of the memory box 1 by writing parameter modification values that are calculated while asynchronously reading parameter values from the memory box 1.

The present invention is advantageous in that a plurality of workers share parameters with each other through shared memory provided by a memory box which is a shared memory device, instead of using a parameter server to share parameters therebetween in distributed deep learning.

Further, the present invention is advantageous in that parameters are transmitted and received in a local memory access manner rather than in a communication message format, thus accelerating deep learning by reducing communication overhead and by shortening the time required for message processing.

Furthermore, the present invention is advantageous in that a plurality of workers may transparently share parameters with each other through a memory box, without modifying an original function of a deep-learning framework and a deep-learning model development and training interface used by a user, when supporting a scheme in which a parameter server is replaced with the memory box in distributed deep learning.

As described above, in the parameter-sharing apparatus and method according to the present invention, the configurations and schemes in the above-described embodiments are not limitedly applied, and some or all of the above embodiments can be selectively combined and configured such that various modifications are possible.

What is claimed is:

1. A parameter-sharing method comprising:
receiving parameter information for allocating a memory area for a parameter to be stored in a memory box;
locking a mapping table of the memory box and reading the mapping table;
determining, based on the parameter information, whether a memory area for the parameter has been allocated in the memory box through the mapping table;
writing the mapping table, in which mapping information is modified depending on whether the memory area has been allocated, to the memory box and unlocking the mapping table; and
sharing the parameter in consideration of a memory address at which the memory area is allocated, wherein sharing the parameter comprises,
reading a value of the parameter in the memory box with reference to the memory address,
calculating a parameter difference value corresponding to a parameter value read from the memory box using a model algorithm; and
modifying the parameter value of the memory box using a parameter difference value,
wherein modifying the parameter value is configured to, when the memory box is incapable of performing an assign_add function, re-read the parameter value from the memory box and write a parameter modification value, calculated using the parameter difference value and the re-read parameter value, to the memory box.

2. The parameter-sharing method of claim 1, wherein receiving the parameter information is configured to receive parameter information including at least one of an identifier and a size of the parameter.

3. The parameter-sharing method of claim 2, wherein the mapping table is configured such that pieces of mapping information including the identifiers of parameters, memory addresses of memory areas, and reference counts are recorded in respective entries.

4. The parameter-sharing method of claim 3, wherein determining whether the memory area for the parameter has been allocated is configured to:
check the entries of the mapping table, and
when the memory area for the corresponding parameter has been allocated in the memory box, increase a reference count in an entry of the mapping table corresponding to the parameter, thus updating the mapping table.

5. The parameter-sharing method of claim 4, wherein determining whether the memory area for the parameter has been allocated is configured to:
check the entries of the mapping table, and
when the memory area for the corresponding parameter has not been allocated in the memory box, allocate a memory area corresponding to a size of the parameter in the memory box, and add mapping information about the parameter for which the memory area is allocated to a new entry of the mapping table, thus updating the mapping table.

6. The parameter-sharing method of claim 5, wherein unlocking the mapping table is configured to record a memory address of the parameter for which the memory area is allocated in the memory box, in the parameter-sharing apparatus.

7. The parameter-sharing method of claim 1, wherein modifying the parameter value is configured to, when the memory box is capable of performing an assign_add function, modify the parameter value of the memory box using the parameter difference value through the assign_add function of the memory box.

8. A parameter-sharing method comprising:
receiving parameter information for releasing a memory area, in which a parameter is stored, from a memory box;
locking a mapping table of the memory box and reading the mapping table;
determining, based on the mapping table, whether to release the memory area to which the parameter is stored from the memory box;
writing the mapping table, in which mapping information is modified depending on whether to release the memory area, to the memory box, and unlocking the mapping table; and
sharing the parameter in consideration of a memory address at which the memory area is released, wherein sharing the parameter comprises,
reading a value of the parameter stored in the memory box with reference to the memory address,
calculating a parameter difference value corresponding to a parameter value read from the memory box using a model algorithm; and
modifying the parameter value of the memory box using a parameter difference value,
wherein modifying the parameter value is configured to, when the memory box is incapable of performing an assign_add function, re-read the parameter value from the memory box and write a parameter modification value, calculated using the parameter difference value and the re-read parameter value, to the memory box.

9. The parameter-sharing method of claim 8, wherein receiving the parameter information is configured to receive parameter information including at least one of an identifier of the parameter and a memory address of the memory area in which the parameter is stored.

10. The parameter-sharing method of claim 9, wherein reading the mapping table comprises:
decreasing a reference count in an entry of the mapping table corresponding to the parameter, thus updating the mapping table; and
deleting the memory address that corresponds to the parameter, recorded in the parameter-sharing apparatus.

11. The parameter-sharing method of claim 10, wherein determining whether to release the memory area to which the parameter is stored is configured to, when the reference count in the mapping table is a minimum value, release the memory area allocated in the memory box and delete the entry of the mapping table corresponding to the memory area.

12. The parameter-sharing method of claim 8, wherein modifying the parameter value is configured to, when the memory box is capable of performing an assign_add function, modify the parameter value of the memory box using the parameter difference value through the assign_add function of the memory box.

* * * * *